(12) United States Patent
Citti et al.

(10) Patent No.: US 9,242,885 B2
(45) Date of Patent: Jan. 26, 2016

(54) SINTERED MATERIAL BASED ON DOPED CHROMIUM OXIDE

(75) Inventors: Olivier Citti, Wellesley, MA (US); Julien Fourcade, Shrewsbury, MA (US)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 238 days.

(21) Appl. No.: 13/985,649

(22) PCT Filed: Feb. 9, 2012

(86) PCT No.: PCT/IB2012/050590
§ 371 (c)(1),
(2), (4) Date: Sep. 26, 2013

(87) PCT Pub. No.: WO2012/110923
PCT Pub. Date: Aug. 23, 2012

(65) Prior Publication Data
US 2014/0013807 A1    Jan. 16, 2014

(30) Foreign Application Priority Data

Feb. 15, 2011 (FR) .................................. 11 51228

(51) Int. Cl.
*C04B 35/42* (2006.01)
*C03B 5/43* (2006.01)
*C03B 5/167* (2006.01)
*C03B 5/237* (2006.01)
*C04B 35/12* (2006.01)
*C04B 35/622* (2006.01)

(52) U.S. Cl.
CPC ............. *C03B 5/43* (2013.01); *C03B 5/1672* (2013.01); *C03B 5/2375* (2013.01); *C04B 35/12* (2013.01); *C04B 35/62204* (2013.01); C04B 2235/3206 (2013.01); C04B 2235/3232 (2013.01); C04B 2235/3236 (2013.01); C04B 2235/3244 (2013.01); C04B 2235/5427 (2013.01); C04B 2235/5436 (2013.01); C04B 2235/72 (2013.01); C04B 2235/727 (2013.01); C04B 2235/77 (2013.01); C04B 2235/9692 (2013.01); Y10T 428/2982 (2015.01)

(58) Field of Classification Search
CPC .................................. C04B 35/12; C03B 5/43
See application file for complete search history.

(56) References Cited

U.S. PATENT DOCUMENTS

| 2,498,622 A | 2/1950 | Mochel |
| 4,724,224 A | 2/1988 | Staley, Jr. et al. |
| 2010/0019419 A1 | 1/2010 | Prior et al. |
| 2011/0033613 A1* | 2/2011 | Matyas et al. ............ 427/142 |

FOREIGN PATENT DOCUMENTS

| EP | 0 546 432 A1 | 6/1993 |
| FR | 2 647 435 A1 | 11/1990 |
| JP | H05-279115 A | 10/1993 |
| SU | 442175 | * 11/1974 |
| SU | 1194859 | * 11/1985 |
| WO | WO 2010/119422 A1 | 10/2010 |

OTHER PUBLICATIONS

Goerenz; "Chromoxid- und Zinnoxid-Werkstoffe (Chromium Oxide and Tin Oxide Materials);" Taschenbuch Feuerfeste Werkstoffe: Aufbau, Eigenschaften, Prüfung, Vulkan Verlag, Essen; Jul. 31, 2007; XP-002554648; p. 143-147.
Sep. 7, 2011 Written Opinion issued in French Patent Application No. FR 1151228 (with translation).
Apr. 4, 2012 Written Opinion issued in International Patent Application No. PCT/IB2012/050590 (with translation).
Apr. 4, 2012 Search Report issued in International Patent Application No. PCT/IB2012/050590 (with translation).
Sep. 25, 2014 Office Action issued in Japanese Application No. 2013-554027.

* cited by examiner

*Primary Examiner* — Karl Group
(74) *Attorney, Agent, or Firm* — Oliff PLC

(57) ABSTRACT

A sintered product having an average chemical composition such that, in weight percentages on the basis of the oxides: $Cr_2O_3$=80.0-99.0%; 0.5%≤$TiO_2$≤9.0%; 0.2%≤MgO≤3.0%; and $ZrO_2$≤5.0%, provided that the ratio of $TiO_2$/MgO is between 1.5 and 9.0 and the molar ratio $TiO_2/Cr_2O_3$ is less than 0.12.

29 Claims, No Drawings

SINTERED MATERIAL BASED ON DOPED CHROMIUM OXIDE

TECHNICAL FIELD

The invention relates in particular to a novel sintered product produced from chromium oxide, to a process for manufacturing it and to the use thereof, especially in a glass furnace.

PRIOR ART

Among refractory products, fused-cast products may be distinguished from sintered products.

Unlike sintered products, fused-cast products usually comprise a highly abundant intergranular glassy phase which fills a network of crystalline grains. The problems encountered in their respective applications by sintered products and by fused-cast products, and the technical solutions adopted for solving them, are therefore generally different. Moreover, because of the major differences between the manufacturing processes, a composition developed for manufacturing a fused-cast product is not a priori able to be used as such for manufacturing a sintered product, and vice versa.

Sintered products are obtained by mixing appropriate raw materials, then forming this mixture in the green state, after which the resulting green part is fired at a temperature and for a time that are sufficient for sintering this green part.

Sintered products, depending on their chemical composition, are intended for widely different industries.

FR 2 647 435 proposes sintered products based on chromium oxide containing titanium oxide and monoclinic zirconia and having good resistance to thermal shock and to corrosion by molten glass.

EP 546 432 proposes sintered products based on chromium oxide containing titanium oxide.

WO 2010/119422 proposes sintered products based on chromium oxide containing titanium oxide and alumina in proportions for improving the sublimation and corrosion resistance.

Sintered products produced from chromium oxide are widely used at the present time in glass furnaces, in particular for furnaces for melting glasses intended for the manufacture of glass fibre. Specifically, dense chromium oxide products exhibit excellent corrosion resistance. Thus, U.S. Pat. No. 4,724,224 describes a sintered block based on chromium oxide having good resistance to corrosion by molten glass. This product contains at least about 1% silica.

However, chromium oxide is particularly sensitive to sublimation when it is exposed to temperatures above 1000° C. in an oxidizing atmosphere, in particular in the presence of moisture.

Finally, if the glass contains volatile species such as alkali metal borates or sodium hydroxide (NaOH), these elements react with the chromium oxide to form alkali metal chromates such as $Na_2CrO_4$. These reactions promote the sublimation of chromium oxide, increase the corrosion and may result in chromium oxides and chromates recondensing in the coolest zones of the furnace, such as the circuit for venting the flue gas (in dust form) to the atmosphere or else on the faces of blocks less exposed to the heat, for example at the back of the blocks. When this recondensing occurs at the back of the feeder blocks or tank blocks, there is also an increased risk of releasing chromium-rich inclusions into the glass.

The current development of very high-quality glasses increases the requirements for refractory products in glass furnaces, especially products used in the tank. There is therefore a need for a new refractory product having good sublimation resistance.

The present invention aims to satisfy this need.

SUMMARY OF THE INVENTION

For this purpose, the invention proposes a sintered product having an average chemical composition such that, in percentages by weight on the basis of the oxides:
$Cr_2O_3$: 80.0-99.0%
0.5%≤$TiO_2$≤9.0%
0.1%≤MgO≤3.0%
$ZrO_2$≤5.0%
providing that the $TiO_2$/MgO molar ratio is between 1.5 and 9.0 and the $TiO_2$/$Cr_2O_3$ molar ratio is less than 0.12.

Unexpectedly, the inventors have discovered that this composition makes it possible to achieve remarkable performance characteristics, and in particular a very good sublimation resistance.

A product according to the invention is therefore very suitable for application as a tank block, in particular when it is intended to come into contact with molten glasses, such as reinforcing glasses (E-glass).

Preferably, a product according to the invention may also have one or more of the following optional features:
- the $TiO_2$/MgO molar ratio is greater than 2.0, greater than 2.5, greater than 3.0 and/or less than 8.0, less than 7.5, less than 7.0, less than 6.0, or even less than 5.5 or less than 5.0;
- the $TiO_2$/$Cr_2O_3$ molar ratio is less than 0.11, less than 0.10, less than 0.09, or even less than 0.08;
- the mass content of chromium oxide is greater than 85.0%, greater than 87.0%, greater than 90.0% and/or less than 98.0%, less than 97.0%;
- the mass content of titanium oxide $TiO_2$ is greater than 0.7%, preferably greater than 1.0%, more preferably greater than 1.5%, or even greater than 2.0%, greater than 2.5%, greater than 3.0% and/or less than 8.0%, preferably less than 7.0%, or even less than 6.0%, less than 5.5%, or less than 5.0%;
- the MgO mass content is greater than 0.15%, greater than 0.20%, greater than 0.24%, greater than 0.25%, or even greater than 0.3% and/or less than 2.5%, less than 2.0%, less than 1.8%, less than 1.5%, less than 1.2%, less than 1.0%;
- in one embodiment, the product contains no zirconia, while in another embodiment the zirconia ($ZrO_2$) mass content is greater than 0.2%, greater than 0.5%, greater than 1.0%, greater than 2.0%, and/or less than 4.5%, or even less than 4.0%;
- the total mass content of the oxide species other than $Cr_2O_3$, MgO, $TiO_2$ and $ZrO_2$ in the sintered product is less than 3.0%, preferably less than 2.0%, preferably less than 1.5%, preferably less than 1.0%, preferably less than 0.9%, more preferably less than 0.7%, and still preferably less than 0.5%, in percentages by weight on the basis of the oxides;
- the oxides represent more than 95%, more than 98%, more than 99%, or even approximately 100% of the mass of the product;
- the apparent porosity is less than 15%, preferably less than 10%, preferably less than 5%, preferably less than 2%, preferably less than 1%;
- the product has a bulk density of greater than 4.0 g/cm$^3$, preferably greater than 4.4 g/cm$^3$, preferably greater than 4.5 g/cm$^3$, or even greater than 4.6 g/cm$^3$; and the product takes the form of a block, preferably having a mass of greater than 5 kg, preferably greater than 10 kg.

The invention also relates to a process for manufacturing a sintered product, comprising the following steps:
a) raw materials are mixed to form a feedstock;
b) a green part is formed from said feedstock; and
c) said green part is sintered to obtain said sintered product, this process being noteworthy in that the feedstock is determined so that said sintered product is in accordance with the invention.

Preferably, a process according to the invention may also have one or more of the following optional features:
- the particulate raw materials providing the oxides (oxide powders and optionally grog(s)) each have a median size of less than 150 µm, preferably less than 100 µm, preferably less than 50 µm;
- the oxides $Cr_2O_3$, $TiO_2$ and MgO and optionally $ZrO_2$, are present in the feedstock in the form of particles of said oxides, and optionally grog of said oxides, said particles together forming a powder blend having a median size of less than 50 µm, preferably less than 40 µm, preferably less than 20 µm, preferably less than 10 µm, or even less than 5 µm;
- the totality of the particles comprising the oxide $Cr_2O_3$ preferably comprises more than 70%, more than 80%, more than 90%, more than 95%, more than 99%, or even approximately 100% $Cr_2O_3$ as a percentage by weight relative to the weight of the totality;
- the totality of the particles comprising the oxide $TiO_2$ preferably comprises more than 70%, more than 80%, more than 90%, more than 95%, more than 99%, or even approximately 100% $TiO_2$ as a percentage by weight relative to the weight of the totality;
- the totality of the particles comprising the oxide MgO preferably comprises more than 70%, more than 80%, more than 90%, more than 95%, more than 99%, or even approximately 100% MgO as a percentage by weight relative to the weight of the totality;
- the totality of the particles comprising the oxide $ZrO_2$ preferably comprises more than 70%, more than 80%, more than 90%, more than 95%, more than 99%, or even approximately 100% $ZrO_2$ as a percentage by weight relative to the weight of the totality;
- the feedstock comprises at least 10% and/or less than 50% grog, in percentages by weight on the basis of the oxides of the feedstock;
- the grog in the feedstock has a median size of less than 50 µm, preferably less than 40 µm, preferably less than 20 µm;
- the feedstock comprises particles comprising, or substantially consisting of, $MgTiO_3$ and/or $Mg_2TiO_4$ and/or $MgTi_2O_5$. In one embodiment, more than 50%, more than 75%, or even substantially 100% by weight of the MgO is supplied in the $MgTiO_3$ form; and
- the forming operation is carried out by isostatic pressing.

The invention also relates to a sintered product manufactured, or able to be manufactured, using a process according to the invention.

Finally, the invention relates to the use of a sintered product according to the invention, or manufactured or able to be manufactured using a process according to the invention, in a glass furnace, in particular in a zone of the furnace likely to come into contact with molten glass or with flue gas emitted by the molten glass, for example in a flue gas venting circuit.

The invention also relates to an installation comprising a product according to the invention, said product being placed in a region of said installation in which it is likely to come into contact with an oxidizing environment at a temperature above 1000° C. or with flue gas emitted by molten glass. The product may in particular be placed in a region of said tank where it is likely to come into contact with a molten glass, in particular with a reinforcing glass, for example of the E-glass, R-glass or S-glass type, an AR (Alkali Resistant) glass or else a glass for insulation fibres.

Other features and advantages of the invention will become more apparent on reading the following detailed description.

DEFINITIONS

The term "impurities" is understood to mean the inevitable constituents necessarily introduced with the raw materials or resulting from reactions with these constituents. The impurities are not necessary constituents, but merely tolerated.

The term "size" of a particle refers to the average of its largest dimension dM and of its smallest dimension dm: (dM+dm)/2.

Conventionally, the "maximum size" of a particle corresponds to the minimum standard screen mesh through which said particle can pass.

Conventionally, the "median size" of a particle blend refers to the size dividing the particles of this blend into first and second populations that are equal in number, these first and second populations comprising only particles having a larger size than the median size and a smaller size than the median size, respectively.

Conventionally, the term "grog" refers to a particle powder obtained by milling a sintered body to the desired particle size. The sintered body may be prepared specifically or else it may be manufacturing scrap or else a spent product that can thus be recycled.

An E-glass has a chemical composition, according to the ASTM D 578-05 standard "Standard Specification for Glass Fiber Strands", in percentages by weight, as follows:
$B_2O_3$: 0-10%
CaO: 16-25%
$Al_2O_3$: 12-16%
$SiO_2$: 52-62%
MgO: 0-5%
alkali metal oxides: 0-2%
$TiO_2$: 0-1.5%
$Fe_2O_3$: 0.05-0.8%
fluorine: 0-1%.

Unless otherwise mentioned, the percentages are all percentages by weight on the basis of the oxides when reference is made to the sintered product or to the feedstock.

DETAILED DESCRIPTION

A product according to the invention may be manufactured according to steps a) to c) described above.

These steps are conventional but, in step a), the feedstock is determined, in a manner well known to those skilled in the art, so that the sintered product obtained after step c) has $Cr_2O_3$, $TiO_2$, MgO and optionally $ZrO_2$ contents that fall within the ranges of the invention described above, in particular within the preferred ranges.

A minimum $TiO_2$ content is considered to be necessary for obtaining a useful technical effect. However, the $TiO_2$ content must be limited so as to avoid reducing the corrosion resistance.

In one embodiment, no zirconia is added to the feedstock. However, in another embodiment, the feedstock is determined so that the sintered product comprises zirconia. The thermal shock resistance of the product is advantageously improved thereby.

The feedstock is also preferably determined so that the total content of the oxide species other than $Cr_2O_3$, $TiO_2$, MgO and optionally $ZrO_2$, in the sintered product, hereafter called the "other oxide species", is limited. Preferably, less than 1% by weight of the raw materials that are not sources of $Cr_2O_3$, $TiO_2$ and MgO, and optionally $ZrO_2$, are introduced into the feedstock.

By definition, the other oxide species constitute the balance to 100% of the oxides $Cr_2O_3$, $TiO_2$ and MgO, or optionally $ZrO_2$. By limiting the total content of these other oxide species it is advantageously possible to increase the content of the oxides $Cr_2O_3$, $TiO_2$ and MgO, and optionally $ZrO_2$, and in particular the chromium oxide content. It also makes it possible to limit the content of deleterious species, such as silica, the presence of which tends to reduce the corrosion resistance.

Preferably, the other oxide species consist of impurities, that is to say no other species other than $Cr_2O_3$, $TiO_2$, MgO and optionally $ZrO_2$ is introduced into the feedstock for the purpose of modifying the composition of the sintered product. At contents below 3.0% in the sintered product, as a percentage by weight on the basis of the oxides, it is considered that the effect of the impurities does not substantially modify the result obtained. Preferably, the total impurity content in the sintered product is less than 1.0%, more preferably less than 0.9%, as percentages by weight on the basis of the oxides.

Preferably, the content of each of the impurities in the sintered product is less than 0.5%, less than 0.3%, or even less than 0.1% or less than 0.05%.

The impurities comprise in particular $Al_2O_3$, $Fe_2O_3$, $P_2O_5$, $SiO_2$, and alkali metal oxides such as $Na_2O$ and $K_2O$, and, among alkaline-earth metal oxides, CaO, SrO and BaO.

Preferably, the feedstock is determined so that, in the sintered product, the following percentages by weight on the basis of the oxides is found:
  $Al_2O_3<1.0\%$, preferably $Al_2O_3<0.5\%$; and/or
  $Fe_2O_3<0.2\%$, preferably $Fe_2O_3<0.1\%$, more preferably $Fe_2O_3<0.08\%$; and/or
  $P_2O_5<1.0\%$, preferably $P_2O_5<0.5\%$; and/or
  $SiO_2<0.9\%$, preferably $SiO_2<0.6\%$, preferably $SiO_2<0.3\%$, preferably $SiO_2<0.1\%$; and/or
  $Na_2O<0.2\%$, preferably $Na_2O<0.1\%$; and/or
  $K_2O<0.2\%$, preferably $K_2O<0.1\%$ with preferably $Na_2O+K_2O<0.2\%$, preferably $Na_2O+K_2O<0.1\%$;
  $CaO<0.6\%$, preferably $CaO<0.5\%$, preferably $CaO<0.2\%$; and/or
  $SrO<0.6\%$, preferably $SrO<0.5\%$, preferably $SrO<0.2\%$; and/or
  $BaO<0.6\%$, preferably $BaO<0.5\%$, preferably $BaO<0.2\%$.

A limited $Al_2O_3$ content makes it possible to avoid the risk of formation of refractory defects in the bath of molten glass.

Alkali metal oxides such as $Na_2O$ and $K_2O$ are volatile species and their content must therefore be limited. This limitation furthermore makes it possible to avoid the risk of formation of chromates.

A limited content of CaO and/or SrO and/or BaO makes it possible to avoid the risk of formation of chromates.

A limited $SiO_2$ content makes it possible to have a good corrosion resistance.

The feedstock is also determined so that the oxides represent preferably more than 99.9% of the weight of the sintered product, preferably about 100% of the weight of the sintered product.

Preferably, in the feedstock, the oxide powders each have a median size of less than 150 μm, preferably less than 100 μm, preferably less than 50 μm. More preferably, the blend of these powders has a median size of less than 50 μm, preferably less than 40 μm, preferably less than 20 μm, preferably less than 10 μm, or even less than 5 μm. As a result, the densification of the part during the sintering step is advantageously improved.

It is also preferable for the feedstock to include more than 10% grog. The structure of the grog particles advantageously improves the compacting during formation of the green part.

The grog may be obtained by sintering $Cr_2O_3$ and/or $TiO_2$ and/or MgO and/or $ZrO_2$, powders, followed by milling. The grog may in particular derive from recycling a product according to the invention.

The maximum size of the grog particles is preferably less than 150 μm, preferably less than 100 μm. Preferably, the grog has a median size of less than 50 μm, preferably less than 20 μm.

The grog content in the feedstock is preferably less than 50%, less than 40%, or even less than 30%, as a percentage by weight of the feedstock.

Apart from the raw materials metered so that the sintered product has the desired average chemical composition by weight, the feedstock may conventionally also include standard binders, for example an organic binder, and/or deflocculants.

In step b), the blend prepared in step a) may be poured into a mould and then undergoes a forming operation, to form a green part.

Preferably, the mould is shaped so that the sintered product obtain takes the form of a block having a weight of greater than 5 kg, preferably greater than 10 kg. Such blocks are well suited to the intended applications.

The forming may for example result from an isostatic pressing, a slip casting, a uniaxial pressing, a gel casting or a vibrocasting technique, or from a combination of these techniques.

Preferably, the forming results from an isostatic pressing technique at pressures above 100 MPa. Indeed, this technique allows more reactive sintering and enables denser sintered products to be obtained. The apparent porosity of the sintered products may thus be less than 15%, preferably less than 10%, preferably less than 5%, preferably less than 2%, preferably less than 1%. The bulk density of the sintered products may be greater than 4.0 g/cm$^3$.

In step c) the green part is sintered.

The sintering is preferably carried out at a temperature between 1400 and 1700° C., in a reducing or oxidizing atmosphere, preferably in a reducing atmosphere, and preferably at atmospheric pressure.

After the sintering, a sintered product according to the invention is obtained.

Advantageously, a sintered product manufactured using the above process has a sublimation Is, according to the test defined below, of less than $7.5 \times 10^{-6} \%\cdot s^{-1}$, less than $6.0 \times 10^{-6} \%\cdot s^{-1}$, less than $5.0 \times 10^{-6} \%\cdot s^{-1}$, or even less than $4.0 \times 10^{-6} \%\cdot s^{-1}$, or less than $3.5 \times 10^{-6} \%\cdot s^{-1}$.

EXAMPLES

The following non-limiting examples are given for the purpose of illustrating the invention.

In these examples, the following raw materials employed were selected, the percentages given being percentages by weight on the basis of the oxides:

Pcr: a chromium oxide powder containing about 99.5% $Cr_2O_3$ and having a median size of 2.8 µm;
Pti: a titanium oxide powder containing about 95% $TiO_2$ and having a median size of 2.3 µm;
Pmt: a powder containing about 99% $MgOTiO_2$ and having a median size of about 3 µm;
Pzr: a powder containing about 99% $ZrO_2$ and having a median size of about 3.5 µm;
grog 1 obtained from $Cr_2O_3$ and $TiO_2$ powders, containing about 91.5% $Cr_2O_3$, 3.8% $TiO_2$ and 3.5% $ZrO_2$ with a median size of less than 50 µm; and
grog 2 obtained from $Cr_2O_3$ and $TiO_2$ powders, containing about 94.2% $Cr_2O_3$ and 3.8% $TiO_2$ with a median size of less than 50 µm.

Sintered refractory blocks were manufactured according to steps a) to c) described above.

In step b), the blend underwent a forming operation by isostatic pressing so as to form green parts having dimensions of 100 mm×100 mm by about 150 mm in height.

In step c), the green parts were then sintered in a reducing atmosphere, at atmospheric pressure and at a sintering temperature of 1550° C.

The density is given as a percentage relative to the theoretical density of a material having the chemical composition of the specimen. This density has an impact on the mechanical strength of the material and on the corrosion and sublimation resistance (since porosity promotes the penetration of the molten glass or of aggressive species contained in the atmosphere of the furnace). For these reasons, a material having a density of less than 90% of its theoretical density is unacceptable in most applications.

To measure the corrosion resistance, specimens in the form of cylindrical bars of product having a diameter of 20 mm and a height of 100 mm were taken and subjected to a test consisting in rotating the specimens immersed in a bath of molten E-glass (for reinforcing fibres) heated to 1600° C. The rotation speed about the axis of the specimen holder was six revolutions per minute. Such a speed makes it possible for the corrosion interface to be very frequently replenished and therefore makes the test much more stringent. The tests lasts 180 hours. At the end of this period, the immersed portion and the non-immersed portion of each specimen were separated. For each portion, the remaining volume of the specimen was determined and then, by difference, the volume lost during the test was determined. The percentage of lost volume was then calculated from the ratio of the lost volume to the initial volume. The percentage of lost volume of a specimen of a control product (example 1) was chosen as comparison basis.

The ratio of the percentage of immersed volume lost by corrosion of the specimen of the control product to the percentage of immersed volume lost by corrosion of the entire specimen, multiplied by 100, gives a measure of the resistance to corrosion by the glass of the tested specimen relative to that of the control product. In Table 1 below, and also in the claims, the corrosion index thus defined is denoted by "Ic".

Thus, corrosion indices above 100 correspond to a lower loss by corrosion than that of the control product. The products in question therefore exhibit better resistance to corrosion by the molten glass than the control product. Corrosion indices below 100 correspond to a higher corrosion loss than that of the control product. The products in question therefore exhibit lower resistance to corrosion by the molten glass than the control product.

The corrosion resistance is considered here to be particularly satisfactory when the corrosion index Ic is above 110.

The sublimation resistance is measured by thermogravimetric analysis using an ATG SETARAM, model TG96, instrument. To measure the sublimation resistance, specimens in the form of bars having a square base the size of 10 mm and a height of 50 mm were taken and subjected to a test consisting in suspending these specimens in a controlled oxygen environment, in gradually heating them (a rise of 10° C./minute) to 1550° C. and then maintaining this temperature for a hold of ten hours. The change in weight of the specimen is recorded. Thus, the weight loss (the difference between the maximum weight recorded at the start of the hold and the minimum weight recorded at the end of the hold) over the duration of the ten-hour hold is determined. The index Is is the weight loss, expressed as a percentage of the maximum weight of the specimen, per second.

The sublimation resistance is considered here to be particularly satisfactory when the sublimation index Is is at least 20% lower than that of the control example.

Example 1

The control product is the product C1215 sold by Saint-Gobain SEFPRO. This product is currently used for the tanks of glass melting furnaces.

Table 1 indicates the raw materials used.

TABLE 1

| No. | % Pcr | % Pti | % Pmt | % Pzr | % grog 1 | % grog 2 |
|---|---|---|---|---|---|---|
| 2** | 98.8 | | 1.2 | | | |
| 3** | 94.0 | 1.0 | 5.0 | | | |
| 4** | 92.0 | 3.0 | 5.0 | | | |
| 5 | 95.6 | 2.8 | 1.6 | | | |
| 6 | 95.8 | 3.0 | 1.2 | | | |
| 7 | 62.2 | 1.8 | 1.0 | | | 35 |
| 8 | 95.9 | 3.3 | 0.8 | | | |
| 9 | 65.8 | 3.2 | 1.0 | | 30.0 | |
| 10** | 38.3 | 1.2 | 0.5 | | 60.0 | |
| 11 | 92.9 | 2.9 | 1.1 | 3.0 | | |
| 12 | 95.8 | 3.0 | 1.1 | | | |

Table 2 summarizes the results obtained.

The average chemical composition of the various products tested was estimated as percentages by weight on the basis of the oxides. The balance to 100% corresponds to impurities.

TABLE 2

| | Chemical composition (in wt %) | | | | Mass ratios | | Molar ratios | | Density | Bulk | | |
|---|---|---|---|---|---|---|---|---|---|---|---|---|
| No. | $Cr_2O_3$ | $TiO_2$ | MgO | $ZrO_2$ | $TiO_2$/MgO | $TiO_2$/$Cr_2O_3$ | $TiO_2$/MgO | $TiO_2$/$Cr_2O_3$ | (%) | density | Ic | Is (%/s) |
| 1** | 94.5 | 3.8 | | | — | 0.040 | | | 84 | 4.33 | 100 | $8.7 \times 10^{-6}$ |
| 2** | 98.8 | 0.8 | 0.4 | | 2.0 | 0.008 | 1.0 | 0.02 | 70 | 3.62 | ND | ND |
| 3** | 94.0 | 4.2 | 1.7 | | 2.5 | 0.045 | 1.3 | 0.09 | 88 | 4.61 | ND | ND |

TABLE 2-continued

| No. | Chemical composition (in wt %) | | | | Mass ratios | | Molar ratios | | Density (%) | Bulk density | Ic | Is (%/s) |
|---|---|---|---|---|---|---|---|---|---|---|---|---|
| | $Cr_2O_3$ | $TiO_2$ | MgO | $ZrO_2$ | $TiO_2$/MgO | $TiO_2$/$Cr_2O_3$ | $TiO_2$/MgO | $TiO_2$/$Cr_2O_3$ | | | | |
| 4** | 92.0 | 6.1 | 1.7 | | 3.7 | 0.066 | 1.9 | 0.13 | 93 | 4.71 | 105 | ND |
| 5 | 95.6 | 3.6 | 0.5 | | 7.1 | 0.038 | 3.6 | 0.07 | 94 | 4.87 | 139 | $2.7 \times 10^{-6}$ |
| 6 | 95.8 | 3.6 | 0.4 | | 9.5 | 0.038 | 4.8 | 0.07 | 93 | 4.81 | 155 | $3.3 \times 10^{-6}$ |
| 7 | 95.8 | 3.7 | 0.33 | | 11.2 | 0.039 | 5.6 | 0.07 | 92 | 4.78 | 135 | $3.7 \times 10^{-6}$ |
| 8 | 95.9 | 3.6 | 0.25 | | 14.4 | 0.038 | 7.3 | 0.07 | 94 | 4.87 | ND | $5.5 \times 10^{-6}$ |
| 9 | 93.4 | 4.8 | 0.33 | 1.1 | 14.5 | 0.051 | 7.4 | 0.10 | 91 | 4.48 | 134 | $5.4 \times 10^{-6}$ |
| 10** | 93.9 | 3.8 | 0.15 | 2.1 | 24.4 | 0.040 | 12.3 | 0.08 | 90 | 4.39 | 95 | $9.2 \times 10^{-6}$ |
| 11 | 92.9 | 3.5 | 0.38 | 3.0 | 9.4 | 0.038 | 4.7 | 0.07 | 93 | 4.85 | 117 | $3.2 \times 10^{-6}$ |
| 12 | 95.8 | 3.7 | 0.38 | | 9.5 | 0.038 | 4.8 | 0.07 | 94 | 4.85 | 151 | $3.2 \times 10^{-6}$ |

**examples outside the invention;
ND—not detected.

Table 2 shows that it is necessary to have a $TiO_2$/MgO molar ratio of greater than 1.5 in order to obtain sufficient densification and of less than 9 in order to have sufficient corrosion resistance.

Table 2 shows that the tested products according to the invention have a considerably improved sublimation resistance.

The corrosion resistance of the products according to the invention is higher than that of the control product, as Examples 6, 7 and 9 show. However, Example 4 shows that if the $TiO_2$/$Cr_2O_3$ molar ratio becomes greater than 0.12 then the improvement in corrosion resistance is lower, despite good densification.

Of course, the present invention is not limited to the embodiments described and represented, these being provided as illustrative and non-limiting examples.

The invention claimed is:

1. Sintered product having an average chemical composition such that, in percentages by weight on the basis of the oxides:

$Cr_2O_3$: 81.0-99.0%
0.5%≤$TiO_2$≤9.0%
0.15%≤MgO≤3.0%
$ZrO_2$≤5.0% provided that the $TiO_2$/MgO molar ratio is between 1.5 and 9.0 and the $TiO_2$/$Cr_2O_3$ molar ratio is less than 0.12, the sintered product comprising less than 2.0%, by weight on the basis of the oxides, of oxides other than $Cr_2O_3$, $TiO_2$, MgO, and $ZrO_2$.

2. Product according to claim 1, the bulk density of the product being greater than 4.0 g/cm³.

3. Product according to claim 1, in which the molar ratios meet at least one of the following conditions (i)-(iii):
(i) $TiO_2$/MgO>2.5 and $TiO_2$/MgO<9.0,
(ii) $TiO_2$/MgO≥1.5 and $TiO_2$/MgO<8.0,
(iii) $TiO_2$/MgO>2.5, and/or $TiO_2$/MgO<8.0.

4. Product according to claim 1, comprising 0.5 to 5.0% $ZrO_2$, as a percentage by weight on the basis of the oxides.

5. Product according to claim 1, the MgO content being greater than 0.3% and less than 1.5%, or the MgO content being greater than 0.3% and less than or equal to 3.0%, or the MgO content being greater than 0.15% and less than 1.5%, as a percentage by weight on the basis of the oxides.

6. Product according to claim 1, comprising less than 1.0% by weight on the basis of the oxides of oxides other than $Cr_2O_3$, $TiO_2$, MgO and $ZrO_2$.

7. Product according to claim 1, manufactured from a feedstock in which at least the oxides $Cr_2O_3$, MgO and $TiO_2$ are present in the form of particles of said oxides and optionally grog particles of said oxides, said particles together forming a powder blend having a median size of less than 50 μm.

8. Product according to claim 7, manufactured from a feedstock in which at least the oxides $Cr_2O_3$, MgO and $TiO_2$ are present in the form of particles of said oxides and optionally grog particles of said oxides, said particles together forming a powder blend having a median size of less than 10 μm.

9. Product according to claim 1, manufactured from a feedstock comprising at least 10% grog as a percentage by weight on the basis of the oxides.

10. Product according to claim 1, manufactured from a feedstock in which the oxide powders and optionally the grog each have a median size of less than 150 μm.

11. Product according to claim 1, in which $Fe_2O_3$<0.2% and/or $P_2O_5$<1% and/or $SiO_2$<0.5%.

12. Product according to claim 1, in the form of a block having a mass of greater than 5 kg.

13. Installation comprising a product according to claim 1, said product being placed in a region of said installation where it is likely to come into contact with an oxidizing environment at a temperature above 1000° C. or with flue gas emitted by molten glass.

14. Tank comprising a product according to claim 1, said product being placed in a region of said tank where it is likely to come into contact with a molten glass.

15. Product according to claim 1, wherein 0.2%<MgO≤3.0%.

16. Product according to claim 1, wherein 1.0%<$TiO_2$≤9.0%.

17. Product according to claim 16, wherein 1.5%<$TiO_2$≤9.0%.

18. Product according to claim 17, wherein 2.5%<$TiO_2$≤9.0%.

19. Product according to claim 1 having an apparent porosity of less than 10%.

20. Product according to claim 1, wherein $ZrO_2$≤4.5%.

21. Product according to claim 1, wherein the molar ratio $TiO_2$/MgO is less than 7.0.

22. Product according to claim 6, comprising less than 0.5% by weight on the basis of the oxides of oxides other than $Cr_2O_3$, $TiO_2$, MgO and $ZrO_2$.

23. Product according to claim 1, wherein a content of CaO is less than 0.6%.

24. Product according to claim 1, obtained by sintering a green part formed from a feedstock comprising at least 10% and less than 50% of grog.

25. Product according to claim 1, obtained by sintering a green part formed from a feedstock comprising particles comprising at least one of $MgTiO_3$, $Mg_2TiO_4$, and $MgTi_2O_5$.

26. Product according to claim 25, wherein more than 50% by weight of the MgO is supplied in the $MgTiO_3$ form.

27. Process for manufacturing a sintered product according to claim 1, comprising the following steps:
   a) mixing raw materials to form a feedstock;
   b) forming a green part from said feedstock;
   c) sintering said green part to obtain a sintered product.

28. Process according to claim 27, wherein said feedstock comprises particles comprising at least one of $MgTiO_3$, $Mg_2TiO_4$, and $MgTi_2O_5$.

29. Process according to claim 27, wherein the oxides $Cr_2O_3$, $TiO_2$ and MgO and optionally $ZrO_2$ are present in the feedstock in the form of particles of said oxides, and optionally grog of said oxides, said particles together forming a powder blend having a median size of less than 50 μm.

* * * * *